(No Model.) 3 Sheets—Sheet 1.

W. W. INGRAHAM.
APPARATUS FOR CLIPPING, SEPARATING, AND GRADING OATS, &c.

No. 413,344. Patented Oct. 22, 1889.

Witnesses
W. C. Corliss
A. M. Best

Inventor
William W. Ingraham
By Coburn & Thacher
Att'ys (No Model.) 3 Sheets—Sheet 3.
W. W. INGRAHAM.
APPARATUS FOR CLIPPING, SEPARATING, AND GRADING OATS, &c.
No. 413,344. Patented Oct. 22, 1889.
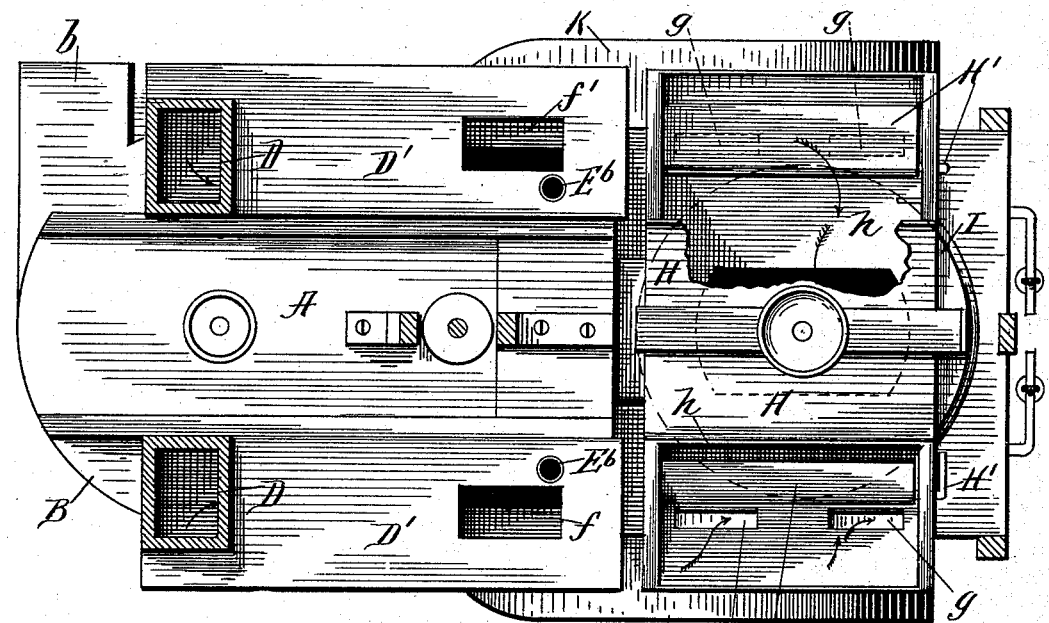
Fig 3.
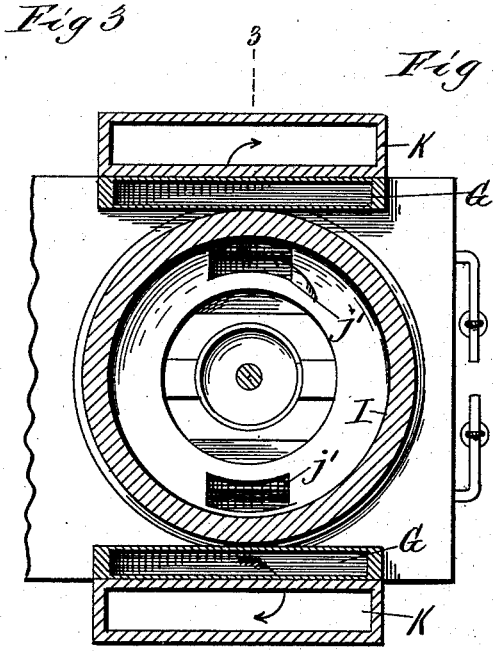
Fig 4.
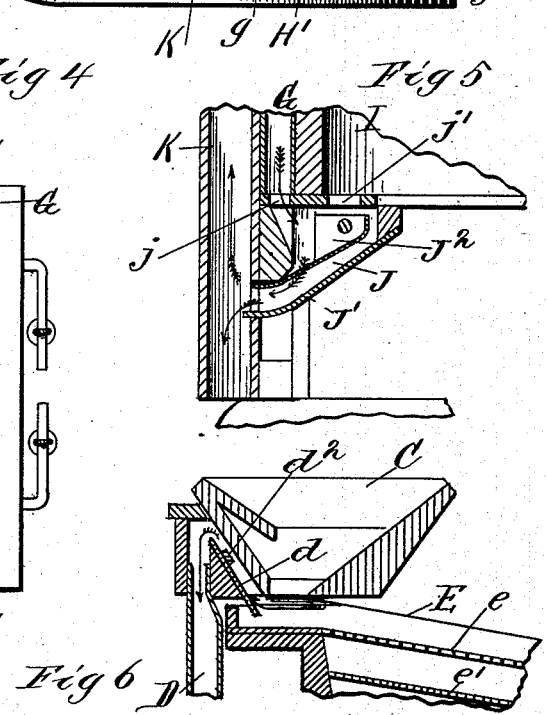
Fig 5.
Fig 6.
Witnesses
W. C. Coolies
A. M. Best
Inventor
William W. Ingraham
By Coburn & Thacher
Att'ys

UNITED STATES PATENT OFFICE.

WILLIAM W. INGRAHAM, OF CHICAGO, ILLINOIS.

APPARATUS FOR CLIPPING, SEPARATING, AND GRADING OATS, &c.

SPECIFICATION forming part of Letters Patent No. 413,344, dated October 22, 1889.

Application filed January 31, 1889. Serial No. 298,266. (No model.)

*To all whom it may concern:*

Be it known that I, WILLIAM W. INGRAHAM, a citizen of the United States, residing at Chicago, in the county of Cook and State of Illinois, have invented a certain new and useful Improvement in Apparatus for Clipping, Separating, and Grading Oats, &c., which is fully set forth in the following specification, reference being had to the accompanying drawings, in which—

Figure 1:
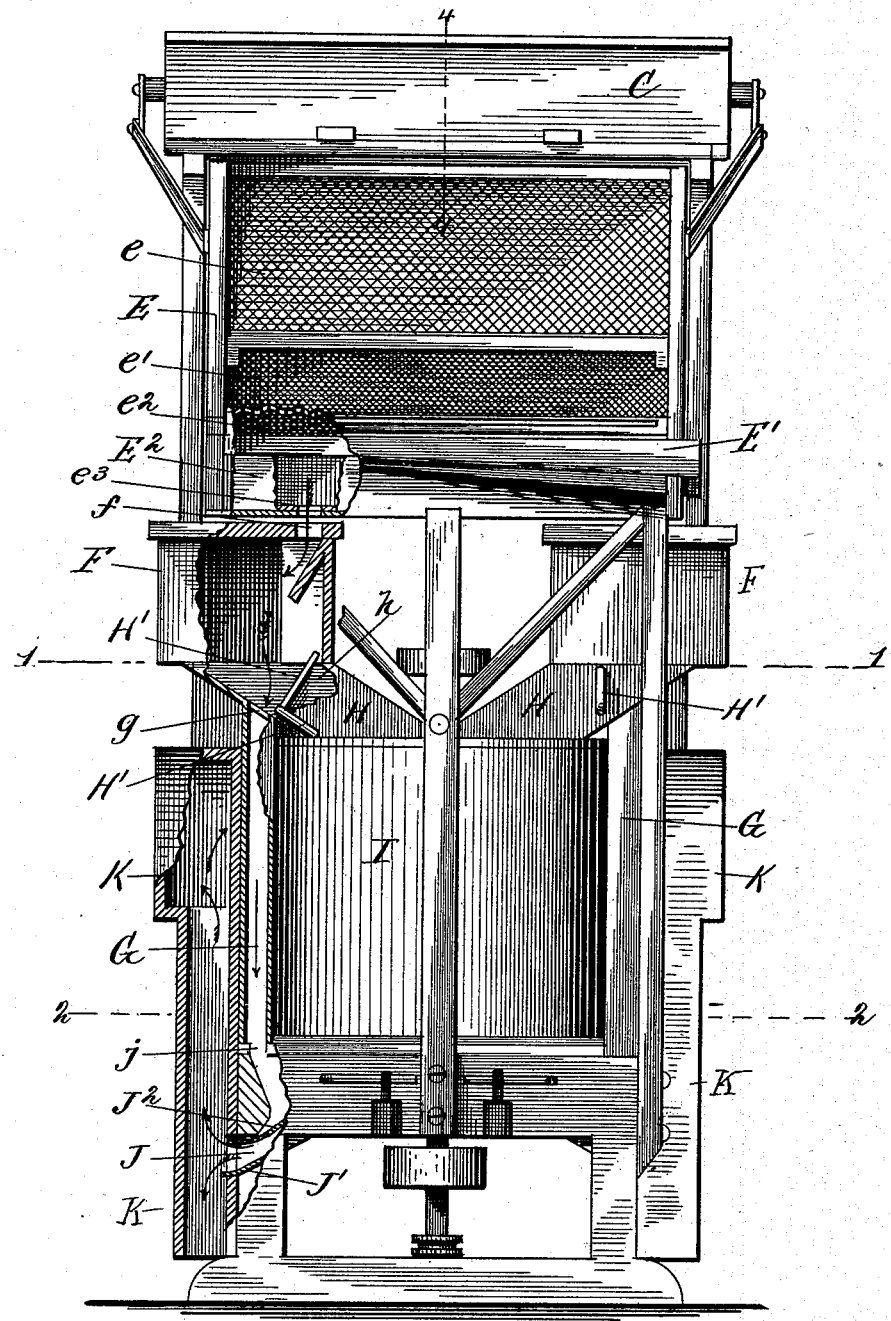
Figure 2:
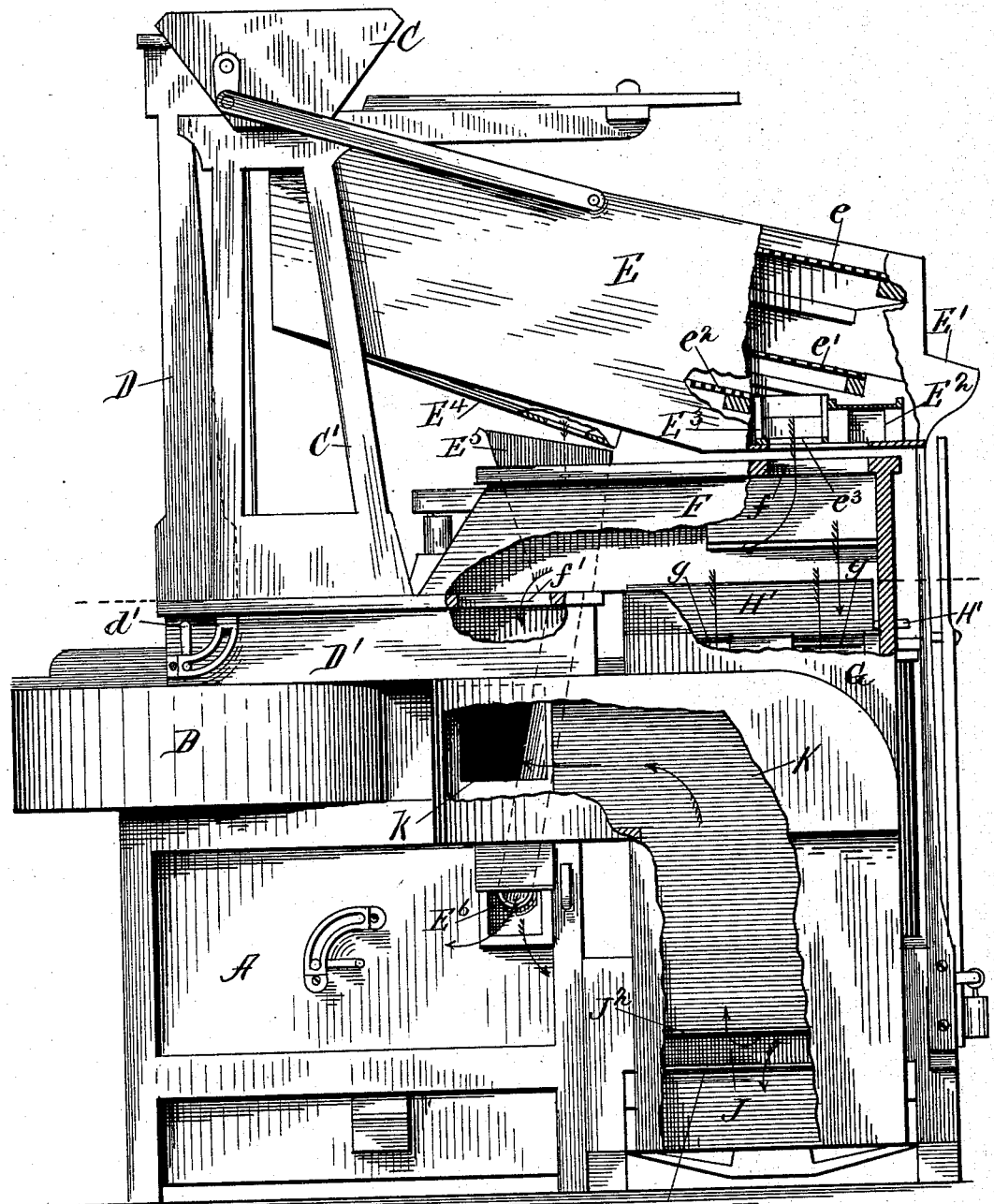

Figure 1 is a front elevation of an apparatus embodying my invention, parts thereof being broken away to show the internal construction; Fig. 2, a side elevation, also partially broken away; Fig. 3, a plan section taken on the line 1 1 of Fig. 1; Fig. 4, a detail plan section taken on the line 2 2 of Fig. 1; Fig. 5, a detail sectional view taken on the line 3 3 of Fig. 4, and Fig. 6 a detail sectional view taken on the line 4 4 of Fig. 1.

Like letters refer to like parts in all the figures of the drawings.

My invention relates to apparatus for grading, separating, and polishing or clipping grain—such as oats, wheat, barley, or the like—and is in the nature of an improvement upon the invention set forth in Letters Patent No. 307,654, granted to me November 4, 1884, and Letters Patent No. 130,804, granted August 27, 1872, to J. C. Hunt and myself.

The object of my present invention is to improve the constructions set forth in said Letters Patent in various respects, so as to produce an apparatus which will be more effective in operation and permit the attainment of superior results.

I will now proceed to describe an apparatus in which I have practically carried out my invention in one form, and will then particularly point out in the claims those features which I deem to be new and desire to protect by Letters Patent, premising that only such portions of the apparatus as present features of novelty will be described at length, those features found in said prior Letters Patent being either only briefly referred to or not referred to at all, as a full description of the same may be found in said prior Letters Patent.

In the drawings, A represents a separating-chamber, which may be of any suitable construction—such, for instance, as that set forth in Letters Patent No. 130,804, above mentioned. On top of this separating-chamber is a fan-casing B, containing a blast-fan, and provided with a discharge-outlet $b$ and with an inlet communicating with the interior of the chamber A.

C represents the main receiving-hopper, which is supported on standards C', in the rear of which is arranged a suction trunk or chute D. As illustrated in Fig. 6 of the drawings, the front wall $d$ of this suction-trunk is parallel with the rear wall of the receiving-hopper C, so that the said trunk virtually terminates at a point immediately below the discharge-orifice of the hopper, extending from this point upward in an inclined direction, and then downward. At its lower end this trunk divides, and is connected with the separating-chamber A by means of lateral horizontal trunks D', extending toward the front of the machine on each side thereof. At the point of junction of the trunk D with the trunks D' valves $d'$ are located, by means of which the draft may be regulated.

In using the apparatus set forth in my Letters Patent, No. 307,654, hereinbefore referred to, I have found that the separation at the base of the hopper was imperfect, for the reason that when a sufficiently strong draft was employed not only the chaff and lighter impurities would be drawn up the incline $d$, but also at times the grain itself. In order to overcome this objection I now provide upon the incline $d$ transverse strips or ledges $d^2$, which serve to prevent the grain from being drawn up the incline $d$ upon the surface upon which it rests, while at the same time it permits the chaff and lighter impurities to be carried over said strip and thence through the trunks D and D' to the separating-chamber.

E represents the shaker, which is in its main features constructed substantially as in my Letters Patent, No. 307,654, before mentioned, being operated in the manner therein set forth, so as to have a rapid vibratory motion. This shaker is provided with an upper screen $e$, of comparatively coarse mesh, and a lower and shorter screen $e'$, finer than the screen $e$. Below the screen $e'$ is arranged the usual cockle-sieve $e^2$. At its front end the shaker E is provided with a discharge-trough E′, into which those matters which fail to pass through the upper screen E are discharged. To the rear of the trough E′ the shaker E is provided with two transverse boxes E² and E³, arranged the one in front of the other and each provided with an inclined bottom. These bottoms are inclined in opposite directions, so that the grain falling into the front box, for instance, accumulates at the right end thereof, while the grain falling into the rear box accumulates at the left end thereof. The lower screen e′, which, as heretofore stated, is shorter than the upper screen e, terminates just above the front box E², so that portion of the grain which is too large to pass through said screen e′ is discharged into the box E². The smaller grain which has passed through the screen e′ and falls upon the cockle-sieve e² is discharged into the rear box E³. The cockle, sand, grass-seed, and other smaller impurities pass through the cockle-sieve e² into a receptacle E⁴, through which they are discharged into a hopper E⁵ at the upper end of a pipe E⁶, by means of which they are discharged from the machine at each side. Each of the boxes E² and E³ is provided at the lower end of its inclined bottom with a discharge-aperture e³, and there is arranged on each side of the apparatus a longitudinal trunk F, provided with an elongated aperture f, arranged immediately below the aperture e³. Each trunk F is connected at its rear end to the corresponding trunk D′ by means of an aperture f′, and consequently with the separating-chamber and blast-fan, so that a blast of air is drawn through said trunk F in the direction indicated by the arrows. These trunks F serve to effect a further separation of the chaff and other light impurities from the grain as it passes downward through the same. Each trunk F is provided at its front end, in the bottom thereof, with an opening g, which communicates with the downward conductor G, and with an opening h, which communicates with an inclined spout or conductor H, which leads to the clipping or polishing drum I. A valve H′, located between these two openings, serves to close either one of the same, and at the same time leave the other one open for the passage of the grain, so that the grain may pass either directly downward through the conductor G without passing through the drum I or may be directed through the spout H to the said drum, according as the position of the valve H′ is shifted. In the former case the grain is discharged directly through an aperture j into the valve-chamber J, and in the latter case, after having passed through the drum, it is discharged through an aperture j′ into the valve-chamber J. These valve-chambers are located one on each side of the apparatus, and are each provided with a spout or bottom J′ and a controlling-valve J². The particular constructions of the drum and these valves are fully set forth in another application filed by me March 6, 1889, Serial No. 302,111, and therefore need no further description here. Each valve-chamber J discharges by its spout J′ into a separating-trunk K, open at its lower end and connected at its upper end by means of an opening k with the separating-chamber A. As the grain is discharged from the valve-chambers J into the separating-trunks K the sound grain, which is heavier, passes out at the bottom of said trunks, while the lighter grain, along with any imperfect grain and other impurities, is drawn upward through the said trunks into the separating-chamber. No detailed description of the operation of this separating-chamber is necessary, as the same is fully described in Letters Patent No. 130,804, hereinbefore mentioned.

From the preceding description the operation of my improved apparatus will be readily understood. It will be observed that not only is a separation obtained as the grain passes from the receiving-hopper C to the screens, but a second separation is also obtained as the grain passes through the trunks F, and a third separation as the grain passes through the trunks K. Moreover, the grain is graded by means of the screens e and e′ and the co-operating boxes E′ and E² in such a manner that the heavier grain is handled and delivered on one side of the apparatus, while the lighter grain is handled and delivered on the other side. Moreover, the grain may be delivered directly from the machine without passing it through the drum; or it may be passed through the drum before delivery, either in part or wholly.

It is obvious that various modifications in the details of construction may be made without departing from the principle of my invention, and I therefore do not wish to be understood as limiting myself strictly to the precise details hereinbefore described, and shown in the drawings.

Having thus described my invention, what I claim as new, and desire to secure by Letters Patent, is—

1. The combination, with the receiving-hopper, of the suction trunk or chute D, having inclined wall d, provided with one or more transverse strips or ledges d² to prevent the passage of the grain, substantially as and for the purposes specified.

2. The combination, with the shaker having screens e and e′ and sieve e², of the boxes E² and E³, having oppositely-inclined bottoms and adapted to deliver the grain from the different sieves at opposite sides of the apparatus, and the duplicate separating-trunks F and K, arranged on each side of the apparatus and adapted to successively receive the grain from the boxes E² and E³, respectively, substantially as and for the purposes specified.

3. The combination, with the shaker and its screens, of the separating-trunks F, the direct conductors G and spouts H, opening into the bottom of each trunk, the drum I, with which said spouts H communicate, and the valves H', whereby the grain may be directed either into the direct conductors G or into the spouts H, substantially as and for the purposes specified.

4. The combination, with the main receiving-hopper and the suction-trunk having its opening adjacent to the discharge-orifice thereof, of the shaker and its screens, the separating-trunks F, which receive the grain as it comes from the screens, the separating-trunks K, the drum I, conductors G and spouts H, and the valves H', substantially as and for the purposes specified.

WILLIAM W. INGRAHAM.

Witnesses:
IRVINE MILLER,
CARRIE FEIGEL.